(12) United States Patent
Coatney et al.

(10) Patent No.: US 9,811,454 B2
(45) Date of Patent: Nov. 7, 2017

(54) CREATING LOGICAL DISK DRIVES FOR RAID SUBSYSTEMS

(71) Applicant: NetApp, Inc., Sunnyvale, CA (US)

(72) Inventors: Douglas Wayne Coatney, Sunnyvale, CA (US); Radek Aster, Campbell, CA (US)

(73) Assignee: NETAPP, INC., Sunnyvale, CA (US)

( * ) Notice: Subject to any disclaimer, the term of this patent is extended or adjusted under 35 U.S.C. 154(b) by 472 days.

(21) Appl. No.: 14/078,352

(22) Filed: Nov. 12, 2013

(65) Prior Publication Data

US 2014/0229671 A1  Aug. 14, 2014

Related U.S. Application Data

(63) Continuation of application No. 12/112,686, filed on Apr. 30, 2008, now Pat. No. 8,612,678.

(51) Int. Cl.
| | |
|---|---|
| *G06F 12/00* | (2006.01) |
| *G06F 12/02* | (2006.01) |
| *G06F 3/06* | (2006.01) |
| *G06F 11/10* | (2006.01) |

(52) U.S. Cl.
CPC ........ *G06F 12/0223* (2013.01); *G06F 3/0605* (2013.01); *G06F 3/0632* (2013.01); *G06F 3/0689* (2013.01); *G06F 11/1092* (2013.01)

(58) Field of Classification Search
CPC .. G06F 12/0223; G06F 3/0605; G06F 3/0632; G06F 3/0689
USPC ........................................................ 711/114
See application file for complete search history.

(56) References Cited

U.S. PATENT DOCUMENTS

| | | | |
|---|---|---|---|
| 5,860,079 A | 1/1999 | Smith et al. | |
| 6,384,842 B1 * | 5/2002 | DeKoning et al. | 715/734 |
| 6,853,546 B2 * | 2/2005 | Rabinovitz | 361/679.02 |
| 7,401,193 B1 | 7/2008 | Ye et al. | |
| 8,566,845 B2 * | 10/2013 | Rajan | 719/327 |
| 2005/0182898 A1 | 8/2005 | Davis et al. | |
| 2006/0179209 A1 * | 8/2006 | Wang et al. | 711/101 |
| 2007/0130424 A1 * | 6/2007 | Hashimoto et al. | 711/114 |

(Continued)

OTHER PUBLICATIONS

Creating RAID 50 Volumes How to combine 2 or more MegaRAID SATA adapters into 1 OS RAID 50 volume [downloaded from www.lsilogic.com/downloads/Public/Obsolete/Obsolete%20Files/rsa-o-s5Ovolume1103.pdf], Nov. 2003, 20 pages.

(Continued)

*Primary Examiner* — Gurtej Bansal
(74) *Attorney, Agent, or Firm* — Nixon Peabody LLP; Anthony M. Duncan, Jr.

(57) ABSTRACT

A computer storage system includes multiple disk trays, each disk tray holding two or more physical disks. The disks on a single tray are virtualized into a single logical disk. The single logical disk reports to the RAID (redundant array of inexpensive disks) subsystem, creating the impression that there is one large capacity disk. In one implementation, each disk in the tray is allocated to a different RAID group. By allocating the disks in a tray to different RAID groups, if the tray is removed, only a portion of several different RAID groups are removed. This arrangement permits a simple reconstruction of the RAID groups if a disk tray is removed from the system.

22 Claims, 4 Drawing Sheets

(56) References Cited

U.S. PATENT DOCUMENTS

2008/0126838 A1* 5/2008 Sangapu ............ G06F 11/1092
714/6.32

OTHER PUBLICATIONS

International Preliminary Report on Patentability for Application No. PCT/US2009/042414 dated Nov. 2, 2009, 5 pages.
International Search Report and Written Opinion for Application No. PCT/US2009/042414 dated Dec. 24, 2009, 7 pages.

* cited by examiner

CREATING LOGICAL DISK DRIVES FOR RAID SUBSYSTEMS

CROSS-REFERENCE TO RELATED APPLICATION

This application is a continuation of U.S. patent application Ser. No. 12/112,686, entitled "CREATING LOGICAL DISK DRIVES FOR RAID SUBSYSTEMS", which was filed on Apr. 30, 2008, which is incorporated by reference herein in its entirety.

FIELD OF INVENTION

The present invention generally relates to computer storage systems, and more particularly, to a method for creating logical disk drives for RAID subsystems.

BACKGROUND

Figure 1:
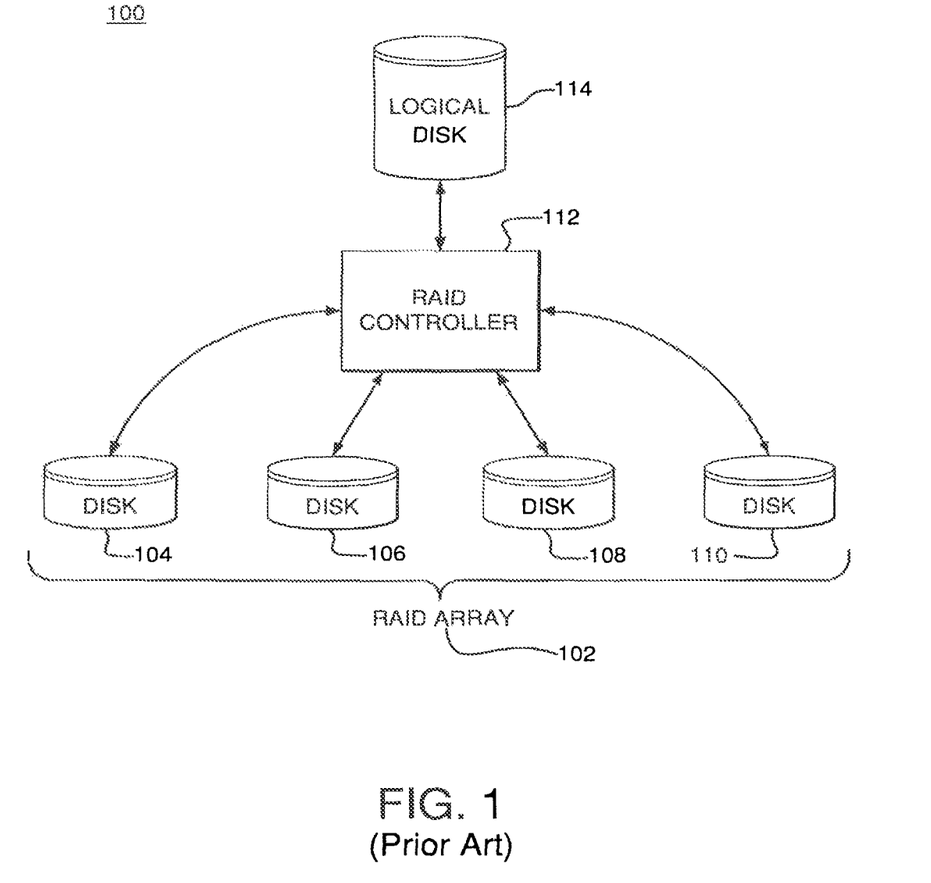
FIG. 1 is a diagram of a general RAID configuration.

Using RAID (redundant array of inexpensive disks) improves fault tolerance and performance of disks. An exemplary RAID system 100 is shown in FIG. 1. A RAID array 102 consists of a plurality of disks 104, 106, 108, 110.

Figure 2:
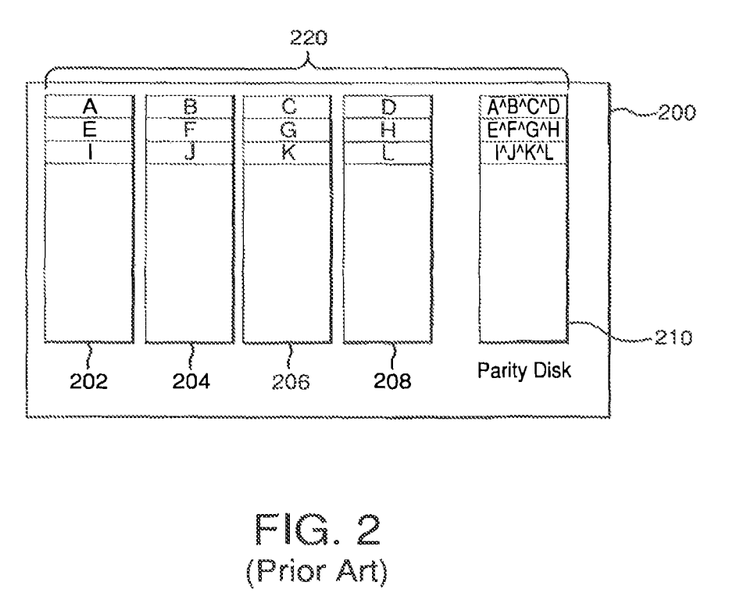
FIG. 2 is a diagram of a RAID4 system with striping and a parity disk.

One example of a RAID system is a RAID4, which is a form of RAID where the data is striped across multiple data disks to improve performance, and an additional parity disk is used for error detection and recovery from a single disk failure. An example of RAID4 striping is shown in FIG. 2. A RAID 200 includes a plurality of data disks 202, 204, 206, 208, and a parity disk 210. The lettered portion of each disk 202-208 (e.g., A, B, C, D) is a "stripe." To the user of the RAID 200, the RAID 200 appears as a single logical disk with the stripes laid out consecutively (A, B, C, etc.). A stripe can be any size, but generally is some small multiple of the disk's block size. In addition to the stripe size, a RAID4 system has a stripe width, which is another way of referring to the number of data disks, and a "slice size", which is the product of the stripe size and the stripe width. A slice 220 consists of a data stripe at the same offset on each disk in the RAID and the associated parity stripe. Performance is improved because each disk only has to record a fraction (in this case, one fourth) of the data.

Removing and replacing a single disk from a RAID group triggers a reconstruction of the data that was on the removed disk. This data is reconstructed onto the replacement disk using the remaining data disks in the RAID group and the parity disk block by block. If a large disk is removed or a RAID group with a large number of disks has one disk removed, the reconstruction operation can be costly in terms of the time needed to reconstruct the removed disk and the processing resources used during the reconstruction operation. This problem is compounded in a storage system where multiple disks are located on a single carrier, such that all of the disks on the carrier are removed at the same time even if only one of the disks needs to be replaced.

SUMMARY

When building storage systems, it is possible to build a tray (also referred to as a sled or a carrier) that has multiple disks associated with it. It is noted that while the storage systems described herein include disks, one skilled in the art can construct similar storage systems with other types of storage devices, such as solid state devices. One solution to the above-identified problem is to make the tray, even though it has individual physical disks, appear as one large logical disk. This essentially presents the tray as a LUN (logical unit number) or some other construct that is independent of the other trays.

For example, a drive environment has 48 disks located on 16 trays of three disks each. Instead of seeing 48 disks, the RAID would see 16 logical disks which are just larger; i.e., each logical disk has three times the capacity of any one physical disk. Each tray of three disks is sequentially addressed and the system software maps those three disks onto a single logical disk. The single logical disk reports to the RAID subsystem, creating the impression that there is one large capacity disk. When the RAID subsystem starts to write data, it writes it to a logical block address (LBA) range which is three times the space of one of the physical disks. The storage subsystem interprets the LBA range to be accessed as being on the first disk, on the second disk, spanning the first disk and the second disk, on the third disk, etc.

In one implementation, each disk in the tray is allocated to a different RAID group. This is beneficial because if, for example, each disk in the tray is a one terabyte disk, the system would start to reconstruct multiple terabyte volumes to reconstruct a RAID group because one failed disk was removed, resulting in a large waste of time and system resources.

By allocating the disks in a tray to different RAID groups, if the tray is removed, only a portion of several different RAID groups are removed. If the system has the capability to copy data from the "good" disks (i.e., the other disks on the tray that have not failed), called rapid RAID recovery, the system can attempt to copy the data directly off of the "good" disks to another tray. The system would then be up and running in less time and would be able to handle dense storage trays being plugged in and out of the RAID array.

BRIEF DESCRIPTION OF THE DRAWINGS

A more detailed understanding of the invention may be had from the following description of preferred embodiments, given by way of example, and to be understood in conjunction with the accompanying drawings, wherein.

DETAILED DESCRIPTION OF THE PREFERRED EMBODIMENTS

In order to create a dense storage system, trays of one, two, or three disks are used that could be removed at one point in time for replacement. This arrangement permits the disks to be placed into a standard 4U type of shelf. This type of physical layout makes the disks individually accessible. If a disk needs to be replaced, the entire tray of disks including the disk to be replaced needs to be removed to be able to disconnect the one disk. For example, in a 48 disk unit, three or four disks would have to be removed at once if one disk had to be replaced.

When a tray is removed, access to all disks on the tray is lost. For a RAID subsystem, removing multiple disks presents a problem. For example, assume that a tray is removed that has four disks on it and that the RAID has striped the data so that multiple RAID groups are affected when the tray is removed. If that tray is replaced, then four disks are being replaced, which causes multiple RAID groups to be reconstructed and rebuilt in the worst case scenario. One way to reconstruct a disk missing from a RAID group (in the case of a RAID4 implementation, for example), is to use the remaining disks in the RAID group and the parity disk for the RAID group to regenerate the data on the missing disk block by block. This leads to large amounts of time and system resources being spent on the reconstruction operation. There is therefore a need for a method wherein a tray having multiple disks can be removed without causing multiple RAID groups to be reconstructed.

The present invention can be implemented in any storage environment where there is a physical carrier with two or more disks. It is noted that while the storage systems described herein include disks, one skilled in the art can construct similar storage systems with other types of storage devices, such as solid state devices.

In one embodiment, the disks on a single tray appear as one large logical disk, even though there are multiple physical disks on the tray. This arrangement presents the tray as a single LUN (logical unit number) that is independent of the other trays in the storage system. The single logical disk reports to the RAID subsystem, creating the impression that there is one large capacity disk. In one implementation, each disk in the tray is allocated to a different RAID group. By allocating the disks in a tray to different RAID groups, if the tray is removed, only a portion of several different RAID groups are removed.

Figure 3:
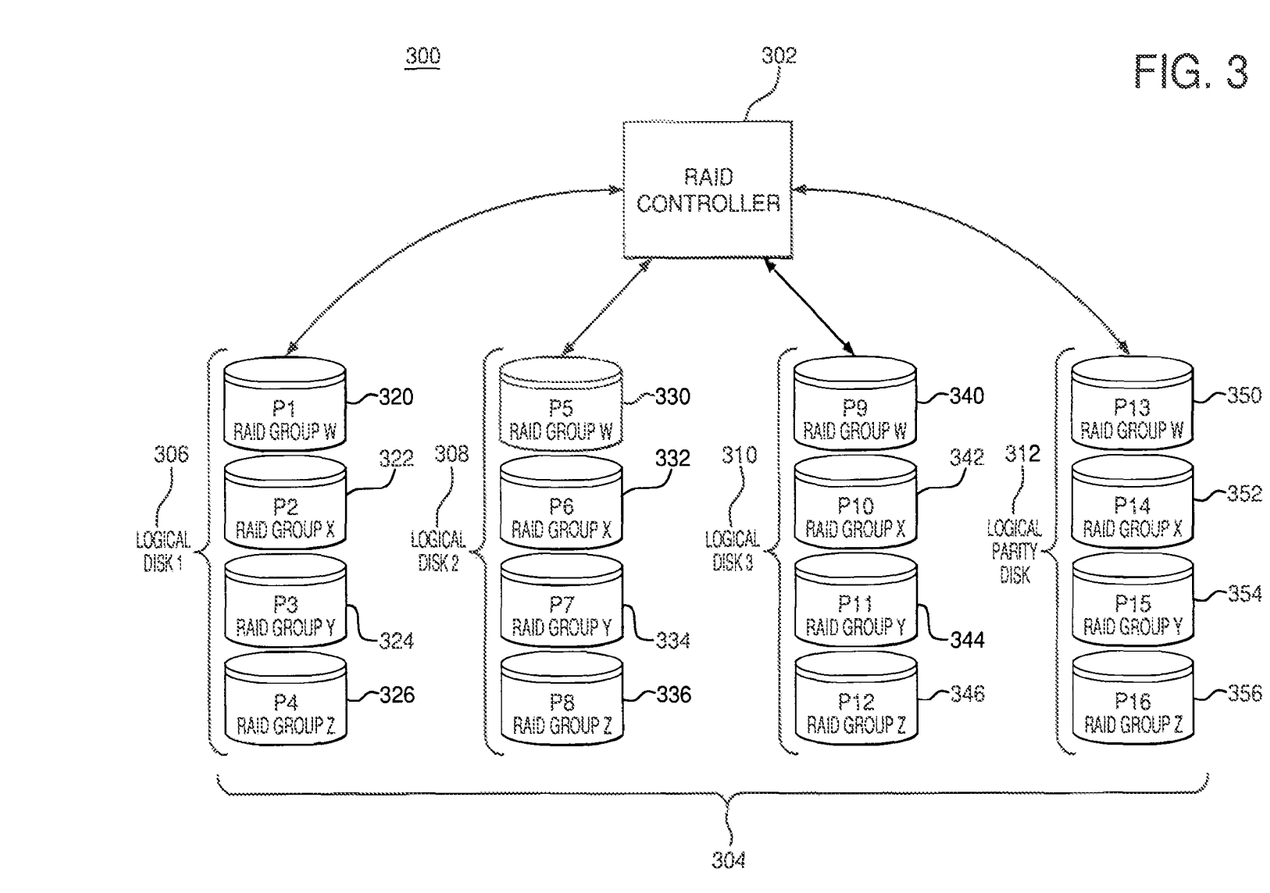
FIG. 3 is a diagram of a virtualized RAID configuration.

FIG. 3 is a diagram of a virtualized RAID configuration 300. A RAID controller 302 sees a RAID array 304 made up of logical disk 1 306, logical disk 2 308, logical disk 3 310, and a logical parity disk 312. Each of the logical disks 306-312 is a single disk tray consisting of four physical disks, such that logical disk 1 includes physical disks P1-P4 320-326, logical disk 2 includes physical disks P5-P8 330-336, logical disk 3 includes physical disks P9-P12 340-346, and the logical parity disk includes physical disks P13-P16 350-356. Which physical disks 320-356 belong to the logical disks 306-312 can be indicated by setting an identifier for each disk by a disk driver located on the filer.

The RAID controller 302 only sees the logical disks 306-312, and does not know that the physical disks 320-356 are present. The RAID controller 302 operates in the same manner as it would if there were only four physical disks connected to the controller. The number of physical disks per logical disk has no effect on the operation of the RAID controller 302. It, is noted that while four physical disks are shown per logical disk, one skilled in the art can change the number of physical disks per logical disk without altering the operation of the RAID controller 302.

A RAID group can be created using one disk from each drive tray in the system. For example, RAID group W includes disks 320, 330, 340, and 350. Each logical disk spans several different RAID groups. For example, logical disk 306 includes a W RAID group disk 320, an X RAID group disk 322, a Y RAID group disk 324, and a Z RAID group disk 326.

The RAID groups are all in a normal RAID group situation, wherein all of the W disks are in one RAID group, all of the X disks are in a second RAID group, all of the Y disks are in a third RAID group, and all of the Z disks are in a fourth RAID group. If the disk tray that contains logical disk 306 is removed with one W disk, one X disk, one Y disk, and one Z disk on it, none of the RAID groups will become doubly degraded, e.g., the entire W RAID group is not removed.

When a disk tray is removed, the problem is that four different RAID groups have to be reconstructed. In other words, the W RAID group component, the X RAID group component, the Y RAID group component, and the Z RAID group component of the removed tray all need to be rebuilt. For example, assume that physical disk P4 326 (of the Z RAID group) is the physical disk on the tray that failed. Then information on the W RAID group disk 320, the X RAID group disk 322, and the Y RAID group disk 324 could be copied to other disks, instead of being reconstructed. The result of this copy operation is that the W RAID group, the X RAID group, and the Y RAID group could be reconstructed more easily because the missing data from the removed disks 320-324 would not have to be generated from corresponding the parity disks 350-354, and can just be copied.

However, virtualizing the RAID group and treating each WXYZ drive tray as a larger disk permits three quarters of the LBA range of the virtual disk to be copied to three quarters of the next logical disk. The operation is abstracted in a virtual sense, meaning that this is basically a copy operation—the information does not have to be reconstructed from a parity disk. Then the simplicity from the RAID group standpoint is that it would see fewer large disks. For example, instead of seeing 48 disks, the RAID would see 12 disks, wherein each disk seen by the RAID controller 302 is actually a disk tray with four physical disks.

To the RAID controller 302, it would look like it is communicating with a disk that has an LBA range of four times the size of any physical disk that was actually present. So the RAID would stripe the data across the logical disks that it is aware of. By viewing the physical disks on a tray as a single logical disk, the net effect is adding the LBA ranges of each disk together and the storage subsystem recognizing where a physical location relating to the LBA is; i.e., mapping multiple physical disks into a single logical disk for RAID access.

Presenting multiple physical disks as a single logical disk is the opposite of what is traditionally thought of as virtualization. This is virtualization within the RAID subsystem itself, whereas virtualization traditionally occurs external to the RAID subsystem. A RAID traditionally approaches virtualization from the opposite direction, by mapping multiple logical devices onto a single physical device.

When implementing the present invention, there is no change in the way the RAID operates. The abstraction is placed below the RAID, so that it is possible for the RAID to handle the removal of a larger number of disks in an easier manner for supportability. Then the RAID does not have to be concerned about the complexities of the layout, because it has already taken care of the layout through the virtualization.

Exemplary System Construction

Figure 4:
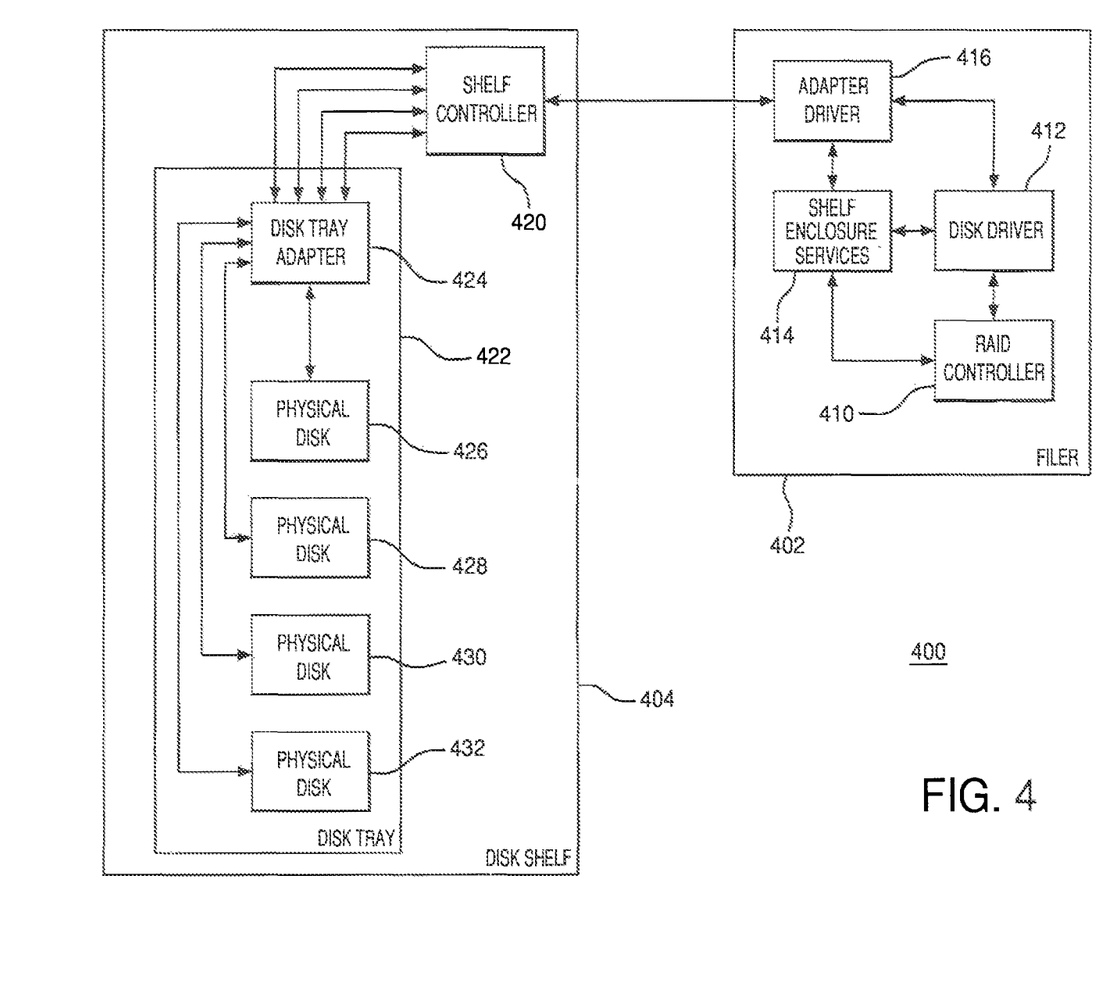
FIG. 4 is a block diagram of a system showing one disk tray and its connections to a RAID controller.

FIG. 4 is a block diagram of a portion of a system 400 configured to implement the present invention. The system 400 includes a filer 402 and a disk shelf 404. The filer 402 includes a RAID controller 410, a disk driver 412 in communication with the RAID controller 410, shelf enclosure services 414 in communication with the RAID controller 410 and the disk driver 412, and an adapter driver 416 in communication with the disk driver 412 and the shelf enclosure services 414. The disk shelf 404 includes a shelf controller 420 and a disk tray 422. The disk tray 422 includes a disk tray adapter 424 and a plurality of physical disks 426-432. The disk tray adapter 424 is in communication with each of the physical disks 426-432 and the shelf controller 420. The filer 402 communicates with the disk shelf 404 via communication between the adapter driver 416 and the shelf controller 420.

The disk driver 412 is the entity in the system 400 that provides the virtualization to the RAID controller 410. The shelf enclosure services 414 receives data from the shelf controller 420 about the configuration of the physical disks 426-432 on the disk shelf 404. The configuration information includes environmental information about the physical layout of the shelf and each disk on the shelf. In one implementation, each disk on the disk shelf 404 is uniquely identified by its physical connection to the shelf 404. For example, a single disk on the shelf 404 may be identified by the bay where it is physically located and an ID number of the shelf 404. The configuration information is provided to the disk driver 412, which uses the information to indicate which physical disks 426-432 on the disk shelf 404 belong to which logical drive(s). In one implementation, the disk driver 412 uses a table to track the assignment of a physical drive to a logical drive. It is noted that one skilled in the art can use other means of identifying each disk on the disk shelf and other means of tracking the assignment of physical disks to logical disks.

After the physical disks 426-432 are assigned to a logical disks, the disk driver 412 presents the logical disk to the RAID controller 410. The elements "above" the RAID controller 410 (i.e., the disk driver 412, the shelf enclosure services 414, and the adapter driver 416) treat the disks 426-432 as individual disk drives. The disk driver 412 provides the virtualization layer to the RAID controller 410, such that the RAID controller 410 only sees the logical disk. In the event that multiple disk trays 422 are present, the disk driver 412 presents multiple logical disks to the RAID controller 410.

It is noted that while only one disk tray 422 and one disk shelf 404 are shown, one skilled in the art can construct a similar system with multiple disk trays and/or multiple disk shelves. When more than one disk tray is present on a single disk shelf, each disk tray communicates with the shelf controller 420 in a similar manner as shown in FIG. 4. When more than one disk shelf is present in the system 400, the shelf controllers for each shelf are in communication with each other, in a cascading style such that only one shelf controller communicates directly with the adapter driver 416. It is also noted that while the disk tray 422 is shown with four physical disks 426-432, one skilled in the art can construct a similar disk tray with different numbers of physical disks.

It is further noted that while the system 400 illustrates a disk shelf, a disk tray, and multiple physical disks, a similar system can be built with other types of storage devices, such as solid state devices. In such circumstances, there would be a storage shelf, a storage tray, and multiple physical storage devices. The system 400 operates in a similar manner, regardless of the type of storage device used.

In operation, the RAID controller 410 sends an input/output (I/O) command to be performed on a logical disk of the RAID subsystem. It is noted that the following description relates to a single I/O command for simplicity; the system 400 operates in the same manner for any number of I/O commands issued by the RAID controller 410.

The disk driver 412 receives the command from the RAID controller 410 and determines which of the physical disks 426-432 should receive the command, based on the mapping of the logical disk to the physical disks 426-432. The disk driver 412 forwards the command along with the determined physical disk to the adapter driver 416. The adapter driver 416 forwards the command to the shelf controller 420, which passes the command to the disk tray adapter 424. The disk tray adapter 424 directs the command to the determined physical disk 426-432. Any response from the physical disk is passed in the reverse direction (through the disk tray adapter 424, the shelf controller 420, the adapter driver 416, and the disk driver 412) to the RAID controller 410.

The present invention can be implemented in a computer program tangibly embodied in a computer-readable storage medium containing a set of instructions for execution by a processor or a general purpose computer; and method steps of the invention can be performed by a processor executing a program of instructions to perform functions of the invention by operating on input data and generating output data. Suitable processors include, by way of example, both general and special purpose processors. Typically, a processor will receive instructions and data from a ROM, a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method for recovering data in logical storage devices for RAID (redundant arrays of independent devices groups in a storage system, comprising:

grouping storage devices as logical units, each logical unit comprising multiple storage devices, such that a RAID controller that controls a RAID subsystem operates on the logical units instead of the individual storage devices in the logical units;

assigning storage devices of a first logical unit to different RAID groups, and storage devices of a second logical unit to corresponding different RAID groups;

striping data of a first RAID group across the first logical unit and a second logical unit;

copying contents of one or more storage devices in the first logical unit to one or more other logical units in response to a failure of a storage device of the storage devices in the first logical unit;

receiving a first indictor that a single physical carrier, including the storage devices of the first logical unit, has been removed from the storage system;

receiving a second indicator that the single physical carrier in the storage system has been reinstalled; and reconstructing data on the first logical unit by copying data from the one or more other logical units back to the first logical unit without using parity information of the copied data.

2. The method of claim 1, further comprising:
assigning storage devices of a second logical unit to the different RAID groups in the RAID subsystem.

3. The method of claim 1, wherein the storage devices of the first logical unit are installed in a single physical tray.

4. The method of claim 1, wherein reconstructing data on the first logical unit by copying data from the one or more other logical units back to the first logical unit is conducted without reconstructing all RAID groups in the storage system.

5. The method of claim 1, further comprising:
determining indicators for storage devices in the RAID subsystem to identify logical storage devices that are associated with the storage devices in the RAID system.

6. The method of claim 1, wherein the multiple storage devices of the first logical unit comprise multiple hard disk drives or solid state drives.

7. The method of claim 1, further comprising:
for an individual RAID group of the RAID groups, striping data of the individual RAID group across logical units of the storage system, such that at least one data stripe of the individual RAID group is located on multiple storage devices that are installed in separate physical trays.

8. The method of claim 7, wherein the individual RAID group is allocated on multiple storage devices that are installed in separate physical trays.

9. A non-transitory machine readable medium having stored thereon instructions comprising machine executable code which when executed by at least one machine, causes the machine to perform a method for configuring RAID (redundant arrays of independent devices) groups in a storage system by:
creating a first logical storage device including multiple physical storage devices that are installed in a first physical tray;
creating a second logical storage device including multiple physical storage devices that are installed in a second physical tray;
creating a first RAID group including at least one of the physical storage devices of the first logical storage device and at least one of the physical storage devices of the second logical storage device;
striping data of the first RAID group across the first logical storage device and the second logical storage device, such that the physical storage devices of the first logical storage device are allocated to different RAID groups and that the physical storage devices of the second logical storage device are allocated to RAID groups corresponding to the RAID groups of the first logical storage device; and
receiving a first indicator of a failure of a physical storage device of the first logical storage device;
in response to the first indicator, copying at least a portion of data stored in the first logical storage device to the second logical storage device;
receiving a second indicator that the physical storage devices of the first logical storage device have been replaced; and
in response to the second indicator, reconstructing data of the first logical storage device by copying data from the second logical storage device back to the first logical storage device without using parity information of the copied data.

10. The storage medium of claim 9, further comprising:
instructions for creating a second RAID group including at least one of the physical storage devices of the first logical storage device and at least one of the physical storage devices of the second logical storage device; and
instructions for striping data of the second RAID group across the first logical storage device and the second logical storage device.

11. The non-transitory machine readable medium of claim 9, wherein the code when executed by the at least one machine further causes the machine to configure the RAID groups in a storage system by:
identifying the first and second logical storage devices to a RAID controller of the storage system, such that the RAID controller operates on the first and second logical storage devices instead of the physical storage devices in the first and second logical storage devices.

12. The non-transitory machine readable medium of claim 9, wherein the reconstructing data of the first logical storage device comprise:
reconstructing data of the first logical storage device by copying data from the second logical storage device back to the first logical storage device without reconstructing all RAID groups in the storage system.

13. The non-transitory machine readable medium of claim 9, wherein the code when executed by the at least one machine further causes the machine to configure the RAID groups in a storage system by:
sequentially addressing the physical storage devices of the first logical storage device under a block address range of the first logical storage device.

14. The non-transitory machine readable medium of claim 9, wherein the code when executed by the at least one machine further causes the machine to configure the RAID groups in a storage system by:
generating a command by a RAID controller of the storage system;
determining a target physical storage device for the command by a storage driver;
sending the command to a physical tray including the target physical storage device; and
executing the commend on the target physical storage device.

15. The non-transitory machine readable medium of claim 14, wherein the determining comprises:
instructions for determining the target physical storage device for the command by the storage driver such that the storage driver virtualizes multiple physical storage devices including the target physical storage devices as one logical storage device to the RAID controller.

16. A server, comprising:
a RAID (redundant arrays of independent devices) controller configured to send commands for controlling a first logical storage device and a second logical storage device, wherein data is striped across said first and second logical storage devices;
a storage device driver in communication with the RAID controller, the storage device driver configured to receive the commands from the RAID controller; and
a tray, comprising:
a tray adapter in communication with the storage device driver; and
multiple physical storage devices in communication with the tray adapter;
wherein the storage device driver is configured to:
determine which of the physical storage devices belongs to the first logical storage device;

determine which of the physical storage devices is to receive the commands intended for the first logical storage device;

copy contents of one or more other physical storage devices in the first logical storage device to other physical storage devices disks in the second logical storage device in response to a failure of a physical storage device from the first logical storage device;

receive a first indicator that the tray, including the physical storage devices of the first logical unit, has been removed from the storage server; and receive a second indicator that the single physical carrier in the storage system has been reinstalled; and reconstruct data on the first logical storage device by copying data from the second logical storage device to the first logical storage device without using parity information of the copied data.

17. The server of claim 16, wherein the RAID controller is further configured to control multiple RAID groups, and the physical storage devices of the tray are allocated to different RAID groups of the multiple RAID groups.

18. The server of claim 16, wherein one or more physical storage devices of the physical storage devices are mapped to the first logical storage device by the storage device driver.

19. The server of claim 16, further comprising:
shelf enclosure services in communication with the RAID controller and the storage device driver, the shelf enclosure services configured to forward information from the tray adapter regarding a configuration of the physical storage devices in the tray to the storage device driver.

20. The server of claim 16, wherein the multiple physical storage devices comprise multiple hard drives or solid state drives.

21. The server of claim 16, wherein the storage device driver determines which of the physical storage devices is to receive the commands intended for the first logical storage device, such that the storage device driver virtualizes the physical storage devices as a single logical storage device to the RAID controller.

22. The server of claim 21, wherein the RAID controller operates on the first logical storage device instead of the individual physical storage devices in the first logical storage device.

* * * * *